(12) United States Patent
Alcantara et al.

(10) Patent No.: US 10,176,092 B2
(45) Date of Patent: *Jan. 8, 2019

(54) SYSTEM AND METHOD FOR EXECUTING DATA PROCESSING TASKS USING RESILIENT DISTRIBUTED DATASETS (RDDS) IN A STORAGE DEVICE

(71) Applicant: NGD Systems, Inc., Irvine, CA (US)

(72) Inventors: Joao Alcantara, Irvine, CA (US); Vladimir Alves, Tustin, CA (US); Ricardo Cassia, Rancho Santa Margarita, CA (US); Vincent Lazo, San Diego, CA (US)

(73) Assignee: NGD Systems, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/710,722

(22) Filed: Sep. 20, 2017

(65) Prior Publication Data

US 2018/0081798 A1     Mar. 22, 2018

Related U.S. Application Data

(60) Provisional application No. 62/397,803, filed on Sep. 21, 2016.

(51) Int. Cl.
*G06F 12/02*     (2006.01)
*G06F 17/30*     (2006.01)
*G06F 9/50*      (2006.01)

(52) U.S. Cl.
CPC ........ *G06F 12/0246* (2013.01); *G06F 9/5066* (2013.01); *G06F 17/30442* (2013.01);
(Continued)

(58) Field of Classification Search
CPC .......... G06F 17/30318; G06F 13/4282; G06F 2212/1044
See application file for complete search history.

(56) References Cited

U.S. PATENT DOCUMENTS 7,650,331 B1     1/2010 Dean et al.
8,549,518 B1 *  10/2013 Aron ................... G06F 9/45558
                                                          718/1

(Continued)

OTHER PUBLICATIONS

Zaharia, Matei et al., "Resilient Distributed Datasets: A Fault-Tolerant Abstraction for In-Memory Cluster Computing", NSDI 2012, Apr. 2012, 14 pages.

(Continued)

*Primary Examiner* — Amresh Singh
*Assistant Examiner* — Courtney Harmon
(74) *Attorney, Agent, or Firm* — Lewis Roca Rothgerber Christie LLP (57) ABSTRACT

A system and method of providing enhanced data processing and analysis in an infrastructure for distributed computing and large-scale data processing. This infrastructure uses the Apache Spark framework to divide an application into a large number of small fragments of work, each of which may be performed on one of a large number of compute nodes. The work may involve Spark transformations, operations, and actions, which may be used to categorize and analyze large amounts of data in distributed systems. This infrastructure includes a cluster with a driver node and a plurality of worker nodes. The worker nodes may be, or may include, intelligent solid state drives capable of executing data processing functions under the Apache Spark framework. The use of intelligent solid state drives reduces the need to exchange data with a central processing unit (CPU) in a server.

16 Claims, 10 Drawing Sheets

(52) U.S. Cl.
CPC .. *G06F 17/30557* (2013.01); *G06F 17/30587* (2013.01); *G06F 2212/7208* (2013.01)

(56) References Cited

U.S. PATENT DOCUMENTS

| | | | |
|---|---|---|---|
| 8,819,335 | B1 | 8/2014 | Salessi et al. |
| 2012/0137059 | A1* | 5/2012 | Yang ................... G06F 3/0611 711/104 |
| 2012/0297145 | A1 | 11/2012 | Castillo et al. |
| 2013/0151443 | A1 | 6/2013 | Kyaw et al. |
| 2013/0263142 | A1 | 10/2013 | Miyamae |
| 2016/0092557 | A1* | 3/2016 | Stojanovic ........ G06F 17/30554 707/723 |
| 2016/0342367 | A1* | 11/2016 | Alcantara ............... G06F 3/061 |

OTHER PUBLICATIONS

Zaharia, Matei et al., "Spark: Cluster Computing with Working Sets", HotCloud 2010, Jun. 2010, pp. 1-7.

\* cited by examiner

FIG. 1

RELATED ART

SYSTEM AND METHOD FOR EXECUTING DATA PROCESSING TASKS USING RESILIENT DISTRIBUTED DATASETS (RDDS) IN A STORAGE DEVICE

CROSS-REFERENCE TO RELATED APPLICATION(S)

The present application claims priority to and the benefit of U.S. Provisional Application No. 62/397,803, filed Sep. 21, 2016, entitled "SYSTEM AND METHOD FOR EXECUTING DATA PROCESSING TASKS USING RESILIENT DISTRIBUTED DATASETS (RDDS) IN A STORAGE DEVICE", the entire content of which is incorporated herein by reference. The present application is related to U.S. Pat. No. 8,819,335, filed Aug. 30, 2013, entitled "SYSTEM AND METHOD FOR EXECUTING MAP-REDUCE TASKS IN A STORAGE DEVICE", the entire content of which is incorporated herein by reference.

FIELD

The following description relates to cloud data storage systems and, more particularly, to a system and method for efficiently executing data processing tasks on large datasets using resilient distributed datasets (RDDs) under Apache Spark framework, and on data stored in driver-worker hardware configurations.

BACKGROUND

Every day, several quintillion bytes of data may be created around the world. These data come from everywhere: posts to social media sites, digital pictures and videos, purchase transaction records, bank transactions, sensors used to gather data and intelligence, like climate information, cell phone GPS signals, and many others. This type of data and its vast accumulation is often referred to as "big data." This vast amount of data eventually is stored and maintained in storage nodes, such as hard disk drives (HDDs), solid state storage drives (SSDs), or the like, and these may reside on networks or on storage accessible via the Internet, which may be referred to as the "cloud." This stored data may also be processed, or be subject to operations, such as during a search, Pattern Mining, Classification, or other processes. Typically, a processing device (e.g., a processing device having a Von Neumann architecture), such as a central processing unit (CPU), in a server performs operations on the data. The data is read from the storage node and processed by the CPU, and the processed data is then sent to the source of a request and/or stored back on the storage node. Standard storage nodes generally do not include computational resources to perform such operations on data stored in the storage node.

Moreover, standard storage node interfaces and protocols, such as Serial Advanced Technology Attachment (SATA), Fibre Channel, NVM Express (NVMe) or Serial Attached SCSI (SAS), do not define commands to trigger the storage node to perform data operations in the storage node. Accordingly, operations are performed outside of the storage node, e.g., in a server CPU. To perform such an operation, a server uses standard read and write commands supported by existing storage node interfaces to move data from and to the storage node. Specifically, the server sends a standard read command to the storage node via a bus. The storage node then sends the stored data over the bus to the server, which typically holds the data in its main memory. The CPU of the server then performs operations on the data to produce a result. Depending on the type of operation, the server provides the result to a requesting source and/or stores the result on the storage node.

There are several disadvantages associated with this process of reading the data from the storage node, and processing the data within the server, and potentially storing the processed data back on the storage node. Because of these disadvantages, the process of performing data operations on the server is referred to as "costly" or "expensive" in terms of system performance and power consumption. Because the server CPU is involved in every step of the process, this process occupies the CPU of the server, consumes power, blocks other user operations that otherwise could have been performed, and may require that the server contain a buffer, or a larger buffer than would otherwise be needed. The buffer is typically the main memory of the CPU, or Dynamic Random Access Memory (DRAM). This process also ties up the communication bus between the server and the storage node since data is sent from the storage node to the server and then back to the storage node. In other words, existing processes for searching and analyzing large distributed unstructured databases are time-consuming and use large amounts of resources such as CPU utilization, memory footprint, or energy.

In summary, typical operations like search, pattern mining, classification, machine learning algorithms and data analysis are, in existing systems, performed on the local server's CPU. Search and processing may be performed over the entire data residing in storage nodes (e.g., solid state drives (SSDs), hard disk drives (HDDs), etc.) within the server. Data needs to be moved from the storage node into the CPU memory where it can then be processed. This is inefficient, e.g., slow, because a single server CPU, which may control a large collection of storage nodes, has relatively little processing power with which to process the large volume of data stored on the collection of storage nodes. Efficiency may also be compromised by one or more data bottlenecks between the server CPU and the storage nodes. Moreover, requiring the server's CPU to do this work makes inefficient use of energy, in part because a general-purpose CPU like a server CPU generally is not optimized for processing large datasets, and in part because transferring data over a data bus and across the interface to the storage node may consume a significant amount of power.

Thus, there is a need for an improved storage device with improved capabilities.

SUMMARY

Aspects of embodiments of the present disclosure are directed toward a system and method of providing enhanced data processing and analysis in a cluster of compute nodes executing data processing tasks in an Apache Spark framework. Apache Spark framework divides a data processing task into a large number of small fragments of work, each of which may be performed on one of a large number of compute nodes. The work may involve Spark transformations, operations, and actions which may be used to categorize and analyze large amounts of data in distributed systems. An Apache Spark cluster contains a driver node and a plurality of worker nodes. The worker nodes include intelligent solid state drives capable of executing the tasks sent by the driver node, which may include organizing the result data into RDDs. The use of intelligent solid state drives reduces the need to exchange data with a CPU in a server and increase the number of worker nodes in the system.

According to an embodiment of the present invention there is provided an intelligent solid state drive including: a storage interface; a processing circuit; a data buffer; and a flash memory; the processing circuit configured to be in communication with the flash memory, and including a central processing unit; the intelligent solid state drive being configured to: receive, through the storage interface, a first command including one or more transformations, and retrieve file data from the flash memory and perform the one or more transformations on the file data to construct a portion of a resilient distributed dataset (RDD).

In one embodiment, each of the one or more transformations is selected from the group consisting of map operations, filter operations, join operations, and combinations thereof.

In one embodiment, the intelligent solid state drive is further configured, upon receiving the first command, to construct a lineage including a sequence of transformations corresponding to the first command.

In one embodiment, the intelligent solid state drive is further configured to receive a second command requesting the elements of the portion of the RDD, and to perform the sequence of transformations of the lineage in response to receiving the second command.

In one embodiment, the intelligent solid state drive is further configured, when the first command includes a cache action, to store at least some of the elements of the portion of the RDD in the data buffer.

In one embodiment, the intelligent solid state drive is further configured, upon receipt of a second command, the second command including a collect operation, to transmit, through the storage interface, the elements of the portion of the RDD.

In one embodiment, the intelligent solid state drive is further configured, upon receipt of the second command: to store at least some of the elements of the portion of the RDD in the data buffer when the first command includes a cache action, and to discard the elements of the portion of the RDD when the first command does not include a cache action.

In one embodiment, the intelligent solid state drive is further configured, upon receipt of a second command, the second command including a persist action, to store at least some of the elements of the portion of the RDD in the data buffer.

In one embodiment, the intelligent solid state drive is further configured to receive a broadcast variable as part of a closure, and to store it until instructed to delete it.

In one embodiment, the intelligent solid state drive is further configured to receive an accumulator as a closure and to not perform any operations on the accumulator except to add to it.

In one embodiment, the intelligent solid state drive is configured to run an operating system configured to enable the intelligent solid state drive to execute a high-level object-oriented programming language.

In one embodiment, a distributed computing system includes a cluster of nodes, the cluster of nodes including: a driver node; and a plurality of worker nodes; wherein a worker node of the plurality of worker nodes is an intelligent solid state drive.

In one embodiment, a method of executing a data processing task in a distributed computing system including a driver node and a plurality of worker nodes, a worker node of the plurality of worker nodes including an intelligent solid state drive, the method including: submitting the data processing task to the driver node; assigning a plurality of tasks to the plurality of worker nodes, by the driver node, the plurality of tasks being configured to execute portions of the data processing task; executing the plurality of tasks, by the plurality of worker nodes; returning the results of the execution of the plurality of tasks, by the plurality of worker nodes, to the driver node; and aggregating, by the driver node, the results of the execution of the plurality of tasks.

In one embodiment, the method includes assigning of a task by a first worker node of the plurality of worker nodes to a second worker node of the plurality of worker nodes.

In one embodiment, a task of the plurality of tasks includes an execution of a machine learning function within an Apache Spark framework.

In one embodiment, a task of the plurality of tasks includes an execution of reduce and collect operations within an Apache Spark framework.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION

The detailed description set forth below in connection with the appended drawings is intended as a description of exemplary embodiments of a system and method for executing data processing tasks using RDDs in a storage device provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Big data may be managed and analyzed using the Apache Spark or Hadoop software framework. Apache Spark is an open source cluster computing framework that provides distributed task dispatching, scheduling, and basic functionality. The fundamental programming abstraction is called Resilient Distributed Datasets (RDDs), which is a logical collection of data partitioned across machines. RDDs can be created by referencing datasets in external storage systems, or by applying coarse-grained transformations on existing RDDs. The Apache Spark framework may implement Map-Reduce functions to distribute the data query, which may be a Map-Reduce job, into a large number of small fragments of work, referred to herein as tasks, each of which may be performed on one of a large number of compute nodes. In particular, the work may involve map tasks and reduce tasks which may be used to categorize and analyze large amounts of data in distributed systems. As used herein, a compute node is a piece of hardware capable of performing operations, and a storage node is a piece of hardware capable of storing data. Thus, for example, a piece of hardware may be, or contain, both a compute node and a storage node, and, as another example, a compute node may include or contain a storage node.

In contrast to Hadoop, the two-stage disk-based MapReduce paradigm, Spark's multi-stage in-memory primitives provide considerable performance improvement. Spark uses a cluster manager and a distributed storage system. Spark simplifies programming complexity because the way applications manipulate RDDs is similar to manipulating local collections of data. The RDD abstraction is exposed through a language-integrated application programming interface (API). A Spark cluster includes one "driver" Java virtual machine (JVM) (driver node) and one or many "executor" JVMs (worker node), and it also supports the MapReduce paradigm, i.e., it may run on existing Hadoop clusters and data.

For instance, a web service may be experiencing errors and an operator may wish to search log files in the Hadoop file system (HDFS) to find the cause. Using Spark, it is possible to load just the error messages from the log files into the server's main memory (DRAM) across a set of nodes and query them interactively. First, an RDD is defined and then a filter transformation is performed to find all lines that contain "ERROR". The user can also perform further transformations on the RDD. After the first action involving errors has run, Spark may store the partitions of errors in memory, considerably speeding up the next computations on them. The user may then query different types of information from the RDD, to provide, for example, the number of errors found in the logs with a single line of code.

Embodiments of the present invention relate to systems and methods for processing large datasets distributed over a large system using solid state storage. According to an embodiment of the present invention, processing of data stored on an intelligent solid state storage node, which may be referred to as an intelligent solid state drive (SSD), does not require comparatively slow reading and re-writing of the data and, instead, is accommodated by performing the processing within the intelligent SSD. Although the present disclosure describes embodiments utilizing one or more intelligent SSDs, the invention is not limited thereto, and in some embodiments an intelligent storage device other than an intelligent SSD (e.g., an intelligent hard drive, or any other device incorporating persistent storage and suitable processing capabilities) is utilized.

Related art or "comparable" SSDs typically include a controller for facilitating the transfer of data to and from the SSD. The CPU in a typical comparable SSD has limited processing capability, which is an obstacle to running an operating system and to running high-level languages such as Python or Scala. It also typically lacks hardware acceleration engines for performing a word count, computing regular expressions, and/or executing supervised learning algorithms (such as linear regression, logistic regression, k-means, or pattern matching), or unsupervised learning algorithms (e.g., involving an autoencoder or sparse coding).

Figure 1:
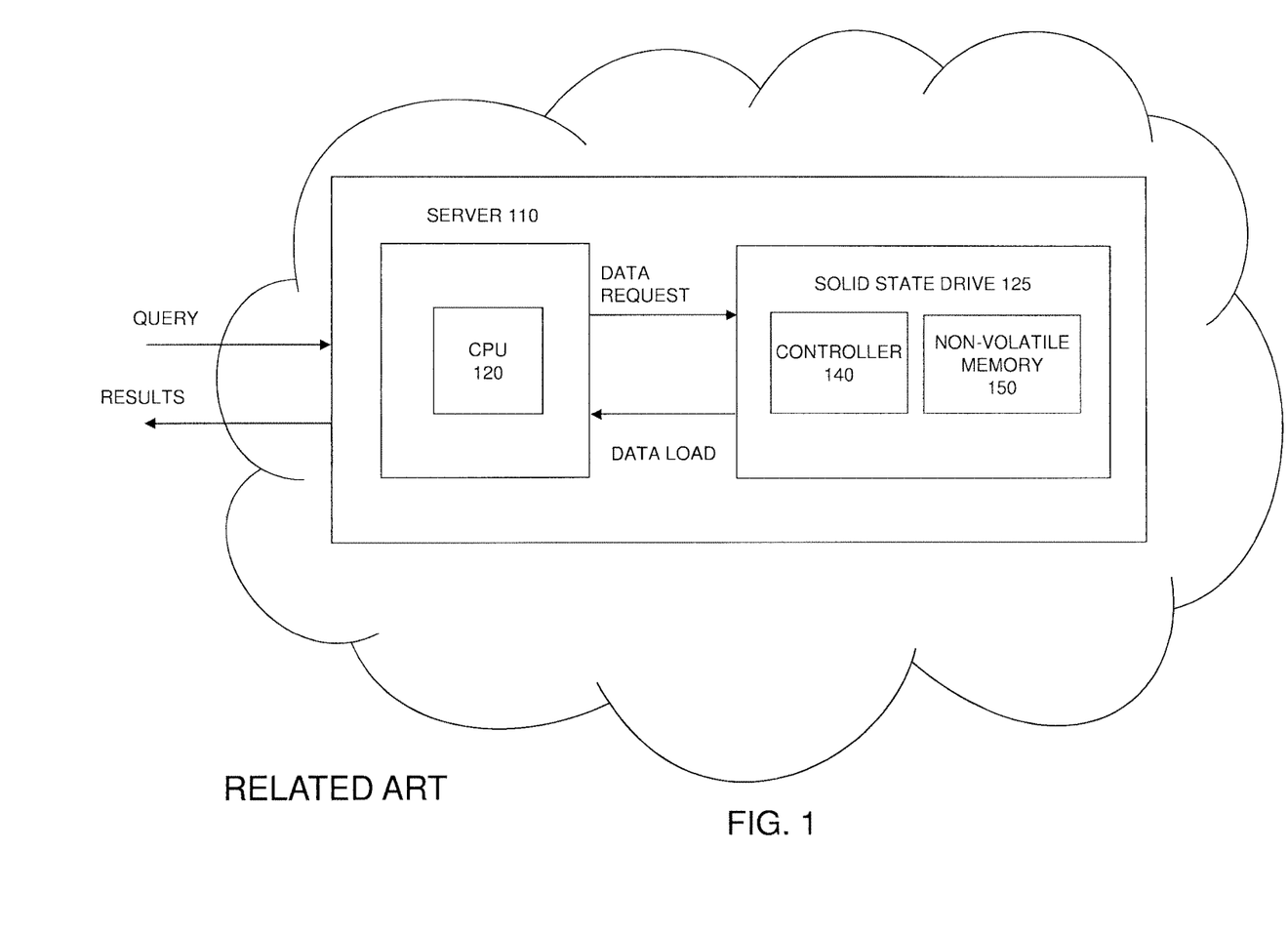
FIG. 1 shows an exemplary block diagram depicting a solid state drive in communication with a server, in accordance with related art systems.

FIG. 1 is a block diagram of a system which includes a server 110 in communication with a storage node for performing data queries according to prior art implementations. FIG. 1 includes a server 110, which can include a processor, such as a server central processing unit (CPU) 120, and a comparable SSD 125, which can include a storage node controller 140 and a non-volatile memory, e.g., a flash memory 150. The server 110 and comparable SSD 125 may be implemented in a cloud-based computing environment. The server 110 and comparable SSD 125 may communicate using any storage buses as well as PCIe with any protocol which runs on it. In other embodiments, storage nodes may be connected to, and controlled by, a host CPU which need not be a server CPU but may be a CPU in an application not configured as a server. Thus, a server CPU may be an example of a host CPU.

As used herein, the phrase "in communication with" refers to in direct communication with or in indirect communication with via one or more components named or unnamed herein. The server 110 and the comparable SSD 125 can be in communication with each other via a wired, optical or wireless connection. For example, in one embodiment, the comparable SSD 125 may comprise pins (or a socket) to mate with a corresponding socket (or pins) on the server 110 to establish an electrical and physical connection. In another embodiment, the comparable SSD 125 can comprise a wireless transceiver to place the server 110 and the comparable SSD 125 in wireless communication with each other. The server 110 and the comparable SSD 125 may be separately housed from each other, or contained in the same housing.

As shown in FIG. 1, in operation, the server 110 may receive a query, which may, for example, entail finding the number of occurrences of a certain pattern or text. As used herein, a pattern is a combination of strings and logical operations, in which the logical operations determine which combinations of the strings, if they are found in a set of data, will constitute a match for the pattern in the set of data. In response, the server 110 may send a data request to the comparable SSD 125. The comparable SSD 125 receives the data request and retrieves the requested data. The comparable SSD 125 then sends the data to the server 110. The server CPU 120 processes the data and returns the results. The server 110 and the comparable SSD 125 may include additional components, which are not shown in FIG. 1 to simplify the drawing.

In one embodiment of the present invention and referring to FIG. 2, an intelligent SSD 130 may have the capabilities of a comparable SSD 125 in addition to further capabilities discussed in detail below. Thus, an intelligent SSD 130 may be used in applications in which a comparable SSD 125 might otherwise be used, such as those described above with respect to FIG. 1.

Figure 3:
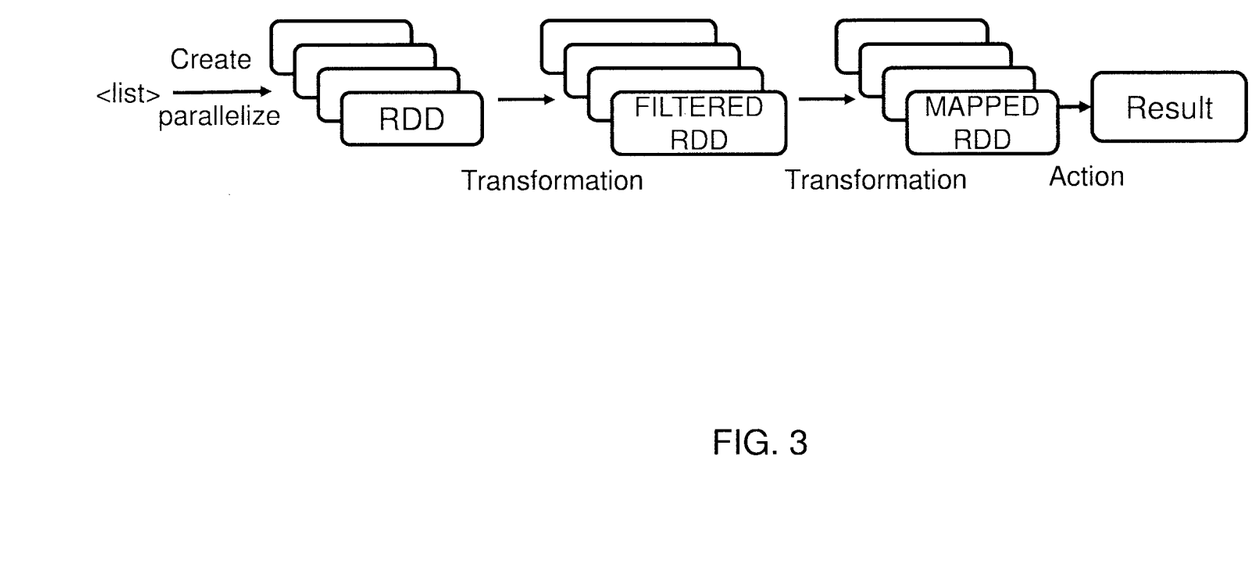
FIG. 3 shows a conceptual flow performed by the Apache Spark framework, in accordance with an embodiment of the present invention.

FIG. 3 illustrates a flow diagram of an exemplary method for performing data processing, described by transformation functions under a framework referred to herein and in the art as an Apache Spark framework, pursuant to aspects of the present disclosure. A user creates Resilient Distributed Datasets (RDDs) from external data, and these RDDs may be distributed over many worker nodes. The user then specifies transformations to the RDDs in order to implement a certain type of distributed data processing. After one or many transformations, one or more actions are triggered to generate the result; examples of actions are count or collect.

As used herein and in the art, a "resilient distributed dataset" (RDD) is a read-only collection of objects partitioned across a set of machines (or nodes), that can be rebuilt if a partition is lost. The RDD may be defined by a sequence of one or more transformations performed either on data in stable storage, or on other RDDs; the set of transformations is referred to herein (and in the art) as the "lineage" of the RDD. The lineage may be represented graphically as a lineage graph, consisting of a chain of boxes, each representing an intermediate RDD or the final RDD, connected by a sequence of arrows, each representing a transformation. The RDD may equivalently be defined by its elements, i.e., the data values that result from performing the transformations in the lineage of the RDD. Examples of transformations include map, filter, and join operations. The RDD achieves fault tolerance through the notion of lineage; the elements of an RDD need not exist in physical storage; instead, a handle to an RDD contains enough information to "compute" the RDD starting from data in reliable storage.

Spark lets programmers construct RDDs in four ways: (i) from a file in a shared file system, (ii) by parallelizing a Scala collection (e.g., an array) in the driver program, which means dividing it into a number of partitions or "slices" that will be sent to multiple nodes, (iii) by transforming an existing RDD, and (iv) by changing the persistency of an existing RDD. By default, RDDs are lazy (in the sense that an RDD's elements are not computed until they are needed) and ephemeral. That is, partitions of a dataset are materialized on demand when they are used in a parallel operation, and are discarded from memory after use. However, a user can alter the persistence of an RDD through two actions: (i) a cache action leaves the dataset lazy, but hints that it should be kept in memory after the first time it is computed, and (ii) a save action evaluates the dataset and writes it to a distributed file system such as the Hadoop distributed file system (HDFS). The saved version is used in future operations on the dataset.

The lineage of an RDD makes possible both its characteristic of being lazy (making it possible to delay computing the elements until they are needed) and its fault tolerance (making it possible to rebuild the RDD in case of failure). RDDs may be implemented in a cluster of systems including a plurality of "workers" or "worker nodes". In some embodiments, each "worker" or "worker node" is an intelligent storage device 130. Each such worker may store files or portions of files, from which RDDs may be created, and it may also create and store RDDs or partitions of RDDs (from files or portions of files, or from other RDDs or partitions of RDDs). As used herein, a "partition" of an RDD is an RDD, or a part of an RDD, for which one worker node is responsible (either by storing the elements of the RDD or the part of the RDD, or by storing one or more predecessor RDDs, files or portions of files, and a lineage specifying how to compute the RDD). As used herein, a "portion" of an RDD is either a partition of the RDD or the entire RDD.

For example, during operation, a worker may receive a command from the driver including one or more transformations, the transformations defining the creation of an RDD from file data (e.g., files or portions of files stored in the worker) and/or from other RDDs. The worker may execute the command by (i) performing the transformations, to compute the elements of the final RDD (the "final" RDD being the end result of the transformations), or by (ii) constructing and storing a lineage including the transformations. The worker may then perform the transformations (by referring to the stored lineage) when it receives a second command that (i) instructs the worker to return the final RDD of the first command, or that (ii) instructs the worker to return a second final RDD (the second final RDD being one defined by the second command) when the forming of the second final RDD involves a transformation that uses, as input, the first final RDD. Examples of second commands having this effect are ones that include the reduce or collect operations defined under Spark.

Each worker may be configured to perform all of the transformations defined under Spark, including map, filter, and join. Each worker may further be configured to perform all of the parallel operations defined under Spark, including reduce, collect, and for each. The collect operation may involve sending all of the elements of the RDD to the driver node. Each worker may further be configured to perform all operations for changing persistence defined under Spark, including cache, persist, and save. The cache and persist actions may indicate to the worker that the last RDD created should be stored, to the greatest extent possible, in memory (i.e., in relatively fast storage). These actions may be employed by the user to speed up processing when an RDD is expected to be used again, e.g., shared across queries. The cache action may be prospective in the sense that (i) it may not cause the elements (or "dataset") of the RDD to be computed (i.e., it may leave the dataset lazy), and that (ii) it may cause the worker to store the RDD elements in fast storage if and when they are computed. The worker may respond to a cache or persist action by storing the entire RDD in the data buffer if the size of the buffer is adequate, and otherwise by storing a portion of the RDD in the data buffer and storing the remainder elsewhere (e.g., in the flash memory). When the RDD receives a command including a collect operation without having received a persist or cache action for that RDD, it may, after sending the elements of the RDD to the driver node, delete the local copies of the elements of the RDD.

The worker may further be configured to receive variables in closures, as defined under Spark, including broadcast variables and accumulators. A broadcast variable may be stored in the worker until the worker is instructed to delete it, making it unnecessary for the driver node to re-send it repeatedly. An accumulator may be an "add only" variable, i.e., the worker may be configured to make no changes to this variable except to add to it. An accumulator may be a useful programming construct for programming the worker to count occurrences.

As such, in the context of Spark, a task performed by a worker node may involve, in response to receiving a suitable command from the driver node, creating a lineage including a plurality of transformations, executing a lineage to compute the elements of an RDD, returning the elements of the RDD to the driver node, or the like.

Figure 2:
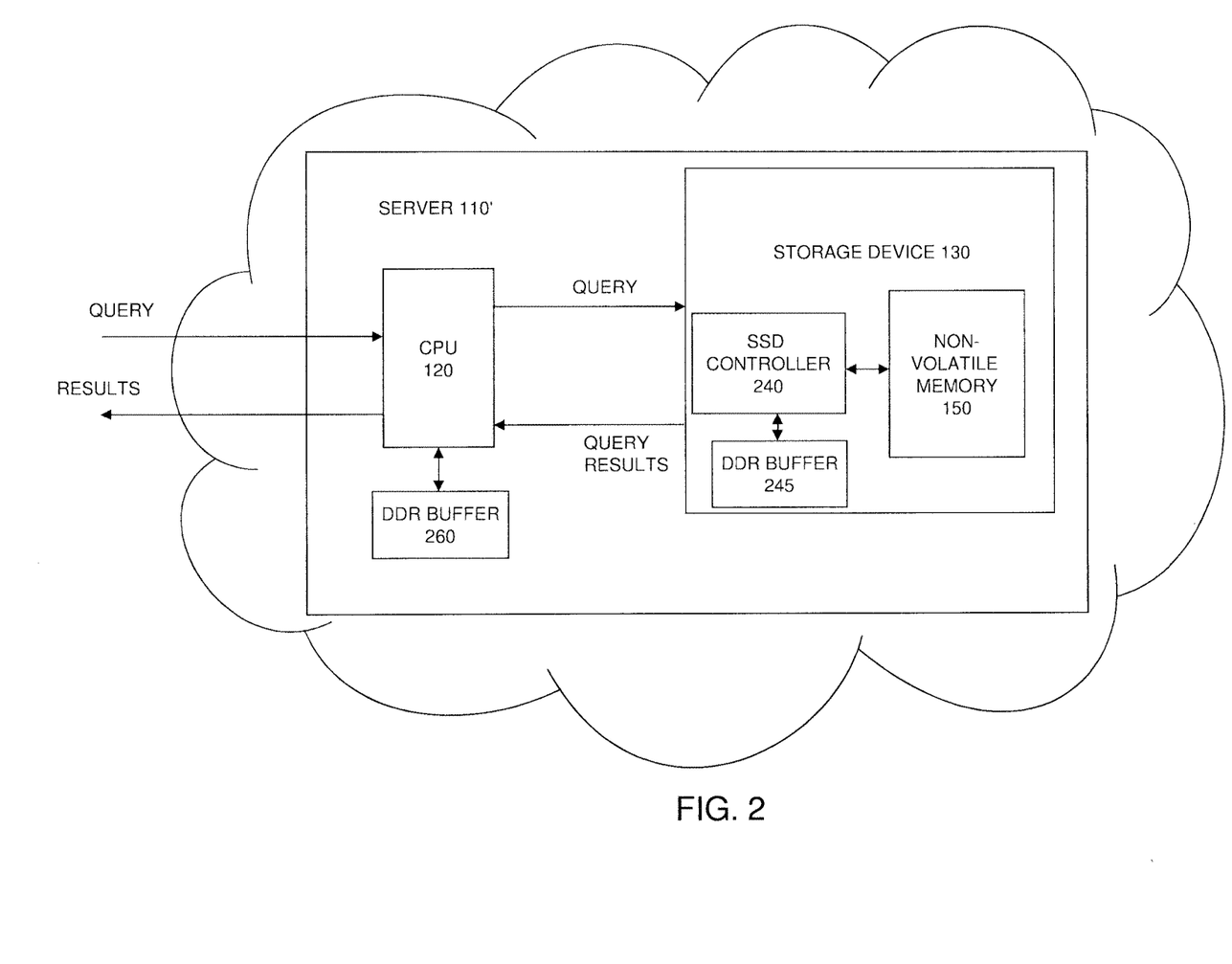
FIG. 2 depicts an exemplary block diagram of a solid state drive in communication with a server, in accordance with an embodiment of the present invention.

FIG. 2 is a block diagram of a system which includes a server 110' containing, and in communication with, an intelligent SSD 130 for performing data queries according to aspects of the present disclosure. The server 110' and intelligent SSD 130 may be part of a cloud-based computing environment, a network, or a separate subsystem. The server may also contain a processor, such as a server central processing unit (CPU) 120, and a data buffer 260, which may be composed of double data rate (DDR) memory. In other embodiments, storage nodes may be connected to, and controlled by, a host CPU which need not be a server CPU but may be a CPU in an application not configured as a server. As used herein, a "data buffer" of an intelligent SSD 130 is a volatile memory connected to or within the controller of the intelligent SSD 130, such as the DDR buffer 245 of FIG. 2 or the buffer unit 460 of FIGS. 4 and 5.

The server 110' and the intelligent SSD 130 can be in communication with each other via a wired or wireless connection. For example, in one embodiment, the intelligent SSD 130 may comprise pins (or a socket) to mate with a corresponding socket (or pins) in the server 110' to establish an electrical and physical connection with, e.g., the server CPU 120. In another embodiment, the intelligent SSD 130 includes a wireless transceiver to place the server 110' and the intelligent SSD 130 in wireless communication with each other. The server 110' and the intelligent SSD 130 may be housed separately from each other, or contained in the same housing.

As shown in FIG. 2, in operation, the server 110' may receive a query, described as RDD transformation and action functions, which may, for example, entail finding the number of occurrences of a certain pattern or text. As used herein, a pattern is a combination of strings and logical operations, in which the logical operations determine which combinations of the strings, if they are found in a set of data, will constitute a match for the pattern in the set of data. In response, the server 110' may send a data request to the intelligent SSD 130. The intelligent SSD 130 receives the data request and retrieves the requested data. The intelligent SSD 130 then sends the data to the server 110'. The server CPU 120 processes the data and returns the results.

According to aspects of the present disclosure, the intelligent SSD 130 includes an SSD controller 240 that is designed for data operations or analytics, such as search and analysis of a large volume of unstructured data. The SSD controller 240 can include, for example, a reconfigurable digital signal processing (DSP) core containing arithmetic and logic units and other dedicated hardware units that may be used to perform data analytics, and other operations such as compression, decompression, encryption, and decryption. In one embodiment, the intelligent SSD 130 includes a suitable embedded CPU. These additional cores and circuitry within the silicon of the SSD controller 240 occupy a small area and as a result consume little power. Although these functions could also be performed on a server CPU, transferring data over a data bus and across the interface to the storage node may consume a significant amount of power. By designing and/or integrating the silicon of the SSD controller 240 to perform the desired functions, their execution can be made significantly more power-efficient. The intelligent SSD 130 may include an SSD controller 240, a buffer 245, and a flash memory 150. The SSD controller may be a processing circuit, as described in further detail below.

In one embodiment, the SSD controller 240 performs querying of data. For example, a data processing job may be composed of a request to find a text word, and/or the number of occurrences of that text word in the storage nodes in the server. According to aspects of the present disclosure, instead of reading contents of the storage node into the server CPU and counting the number of matches, the task can be performed locally within the storage node. The server 110' may be configured to receive queries. When the server (which may be a data node) receives a query, the server passes the query to the storage nodes in the server. Each of these storage nodes, which may be SSDs, may then process the query and return the results to the server, which may compile them. While this process is illustrated with reference to a query, described as Apache Spark function calls, a similar process enables data analytics, machine learning algorithms, and other such operations to be performed on the SSD controller 240.

A query may include pattern matching, word count, or occurrence counting. In both pattern matching and occurrence counting, the data are searched for matches to one or more specified patterns; in pattern matching, the matching data are returned, whereas in occurrence counting only the number of matches is returned. In addition to pattern matching, word count, and occurrence count, the SSD controller 240 may execute code written in high-level languages such as Java™, Scala, or Python. The ability to run those high-level programming languages on the SSD controller 240 may enable the SSD controller 240 to participate in an Apache Spark system and to execute its available data processing tasks. It may also enable the storage node to perform more complex operations in response to communications supported by standard storage node interfaces. The ability to run those high-level programming languages may be provided by a higher performance CPU and an operating system. The unused computing resources of the SSD controller 240 may be used for running the operating system and the high-level programming language for high level operation. Other operations, such as counting the number of occurrences of a string in the SSD data, for which high speed execution at low power consumption is important, may be performed by purpose-designed processing elements or by a DSP core in the SSD controller 240.

Figure 4:
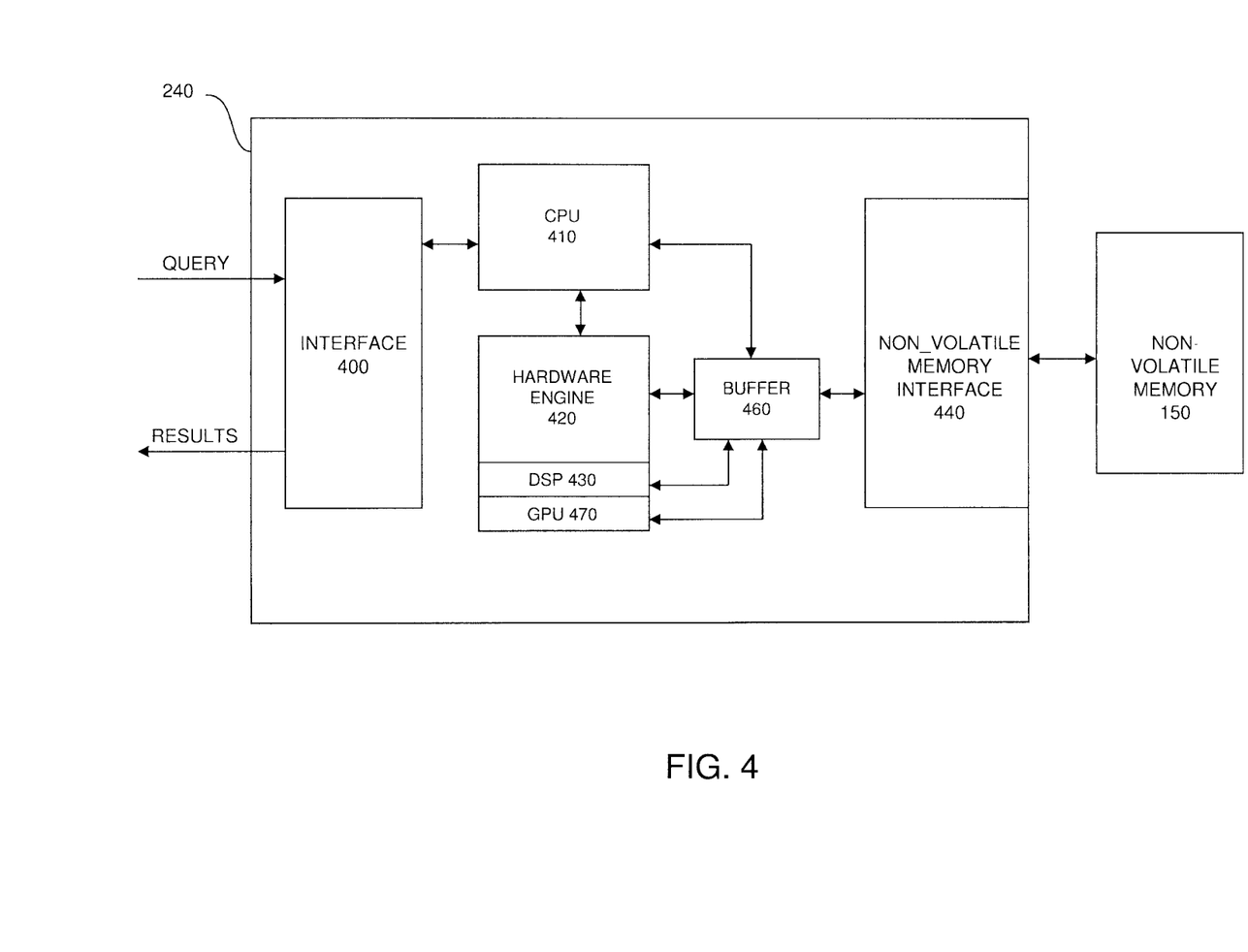
FIG. 4 depicts an exemplary block diagram of a solid state drive controller in communication with a server and flash memory storage, in accordance with an embodiment of the present invention.

FIG. 4 is a block diagram of an SSD controller 240 according to an embodiment of the present invention. The SSD controller 240 includes a storage interface 400, a central processing unit (CPU) 410, a hardware engine 420, a digital signal processor (DSP) or DSP core 430, a graphics processing unit (GPU) or GPU core 470, a buffer unit 460, and a flash interface 440. The storage interface 400 may be, for example, Peripheral Component Interconnect Express (PCIe), Non Volatile Memory Express (NVMe), Non Volatile Memory (NVM) over Fabric, Serial Advanced Technology Attachment (SATA), Fibre Channel, Small Computer System Interface (SCSI), Serial Attached SCSI (SAS), SCSI over PCIe, Ethernet, or Universal Serial Bus (USB). There may be other components on the SSD controller 240 which are not illustrated, such as buffers and the like. The SSD controller 240 communicates with any non-volatile memory, e.g., flash memory 150 (which may be NAND flash memory) or other non-volatile memory through the non-volatile memory interface 440, which may implement a flash channel interface. In one embodiment, there may be a separate hardware engine 420 for each flash channel; the hardware engine 420 may include a hardware-based search engine. The intelligent SSD 130 may conform to a 3.5 inch hard drive form-factor (or "large form factor" (LFF)) standard, or it may conform to a 2.5 inch hard drive form-factor (or "small form factor" (SFF)) standard. In other embodiments, the storage device 105 may conform to a standard PCIe card form factor, e.g., a full-height, full-length (FH-FL) card outline, or a full-height, half-length (FH-HL) card outline.

As used herein, a "search engine" is a digital hardware block designed to test a set of data to determine whether and where it contains matches to a specified pattern. Thus, a comparator implemented in hardware is an example of a search engine, and a more complex search engine may include, among its functional elements, a comparator implemented in hardware. The SSD controller 240 may be a single silicon chip, e.g., a system on a chip (SOC) or Application Specific Integrated Circuit (ASIC), a Field Programmable Gate Array (FPGA), or a combination of integrated circuits comprising SOCs, ASICs, and FPGAs. In one embodiment, the DSP core is a reconfigurable DSP. In one embodiment, the CPU 410, the buffer unit 460, and the flash interface 440 are all integrated onto a single semiconductor chip (e.g., a single silicon chip), along with a hardware engine 420 and/or a DSP core 430, and/or a graphics processing unit (GPU) or GPU core 470. As used herein, a "central processing unit" or "CPU" is a processing circuit that is a stored-program computer, i.e., a circuit that, in operation, repeatedly fetches instructions from memory and executes them. As used herein, a "hardware engine" is a special-purpose processing circuit, such as a hardware search engine.

As shown in FIG. 4, the SSD controller 240 may receive a query through the storage interface 400. In one embodiment, the CPU 410 processes the query by using the hardware engine 420 to compare the requested content of the query with the data on the non-volatile memory 150. The hardware engine 420 may be a hardware-based search engine and may work in conjunction with the DSP 430. In one example, the DSP may perform encryption and decryption and the hardware engine may perform searching. The CPU 410 returns the results of the query to the server 110' through the storage interface 400. In other embodiments, the results of the query or other operation in the intelligent SSD 130 may, instead of being returned to the server CPU 120 or host CPU, be stored in the flash memory 150 or flash memories 150 (FIG. 5), for subsequent retrieval by the server CPU or host CPU. In another example, the GPU core may be used to perform unsupervised learning, such as sparse coding. Sparse coding is a class of unsupervised methods for learning sets of over-complete bases to represent data efficiently.

In one embodiment, the intelligent SSD 130 may perform sophisticated analysis including searches and conditional searches. For example, a server may have stored in it a very large number of email messages, and a user may wish to find messages satisfying certain criteria, having been sent by a particular sender to any recipient at a particular company. The combination of these two criteria may be tested for by a suitably selected pattern, but if the user wishes to narrow the search further, e.g., with an intelligent search of the body of each email to determine whether a particular transaction was discussed, a more sophisticated algorithm than that used for pattern matching may be used. A conditional search may be used in this example, where criteria related to the body of an email are tested for only if an email first meets a first set of criteria, e.g., related to the header of the email; in this case, additional criteria, e.g., a second or third set of criteria related to the body of the email, may be added to the search. A system constructed according to the embodiment illustrated in FIG. 4 is suitable for implementing a broad class of analysis algorithms including searches and conditional searches.

Figure 5:
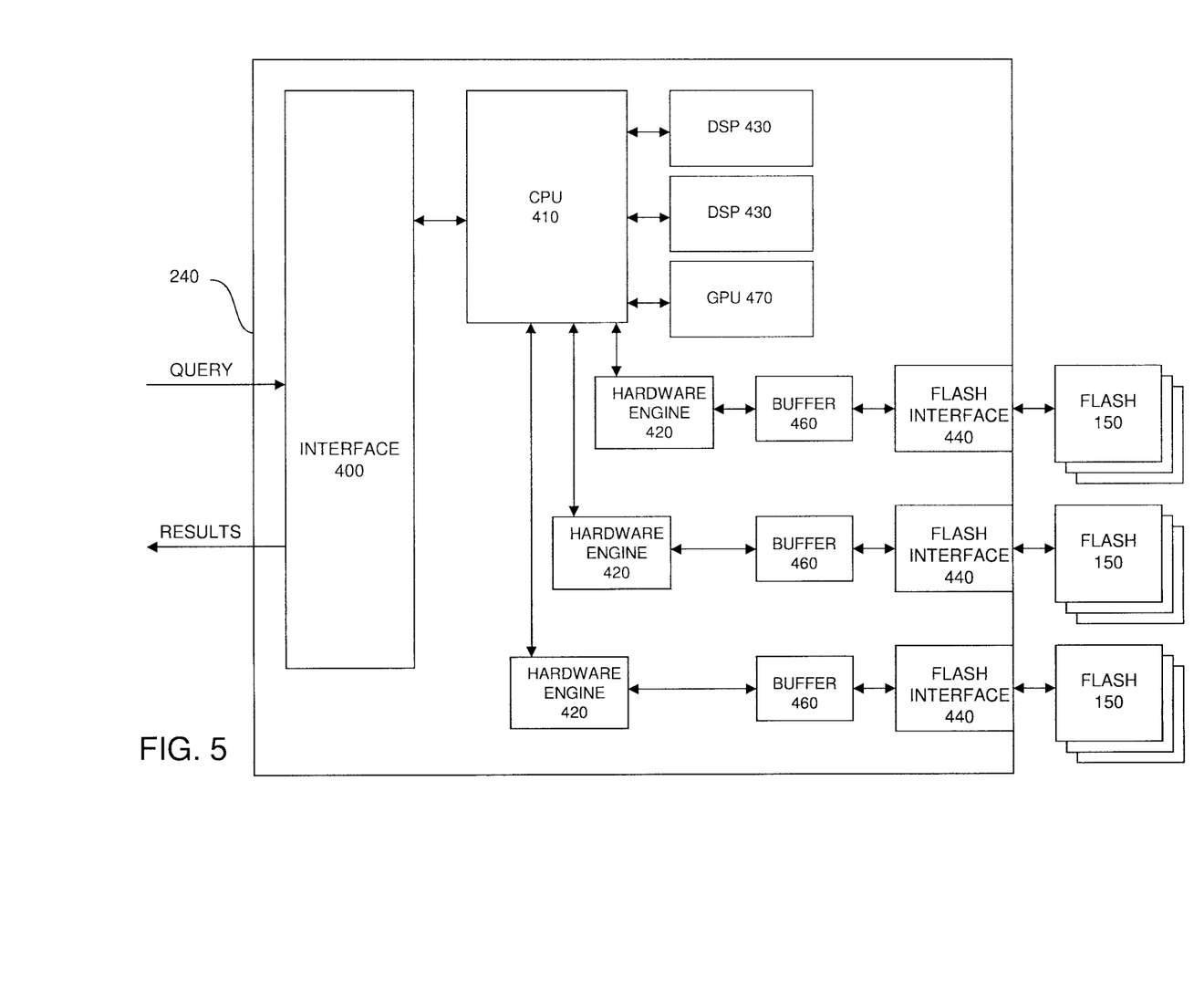
FIG. 5 depicts an exemplary block diagram of a solid state drive controller in communication with a server and a plurality of flash memories, in accordance with an embodiment of the present invention.

Referring to FIG. 5, in one embodiment of an SSD controller 240, the CPU 410 may be connected to a plurality of hardware engines 420, each of which may access a plurality of flash memories 150 through a buffer unit 460 and a flash interface 440. This structure allows searches to be performed in parallel, resulting in shorter processing times.

Applications

The disclosed systems and methods have many potential applications, including but not limited to data queries, data analytics, face recognition, security information and event management (SIEM—an approach to security management that uses real-time analysis of security alerts from log data and network hardware), pattern mining, machine learning algorithm, encryption and decryption. While the illustrations above relate to a query, a similar process may be performed, for example, in relation to data analytics, face recognition, SIEM, pattern mining, machine learning algorithm, classification, compression and decompression, and encryption and decryption.

There are many alternatives that can be used with these embodiments. For example, while solid state drives (SSDs) were discussed in examples above, any type of suitable memory device, such as a hard disk drive (HDD), can be used.

Other embodiments are within the scope and spirit of the invention. For example, the functionality described above can be implemented using software, hardware, firmware, hardwiring, or combinations of any of these. One or more computer processors operating in accordance with instructions may implement the functions associated with managing use of cache devices in accordance with the present disclosure as described above. If such is the case, it is within the scope of the present disclosure that such instructions may be stored on one or more processor readable non-volatile storage media (e.g., a magnetic disk, non-volatile random-access memory, phase-change memory, 3D XPoint™, or other storage medium). Additionally, modules implementing functions may also be physically located at various positions, including being distributed such that portions of functions are implemented at different physical locations.

Figure 6:
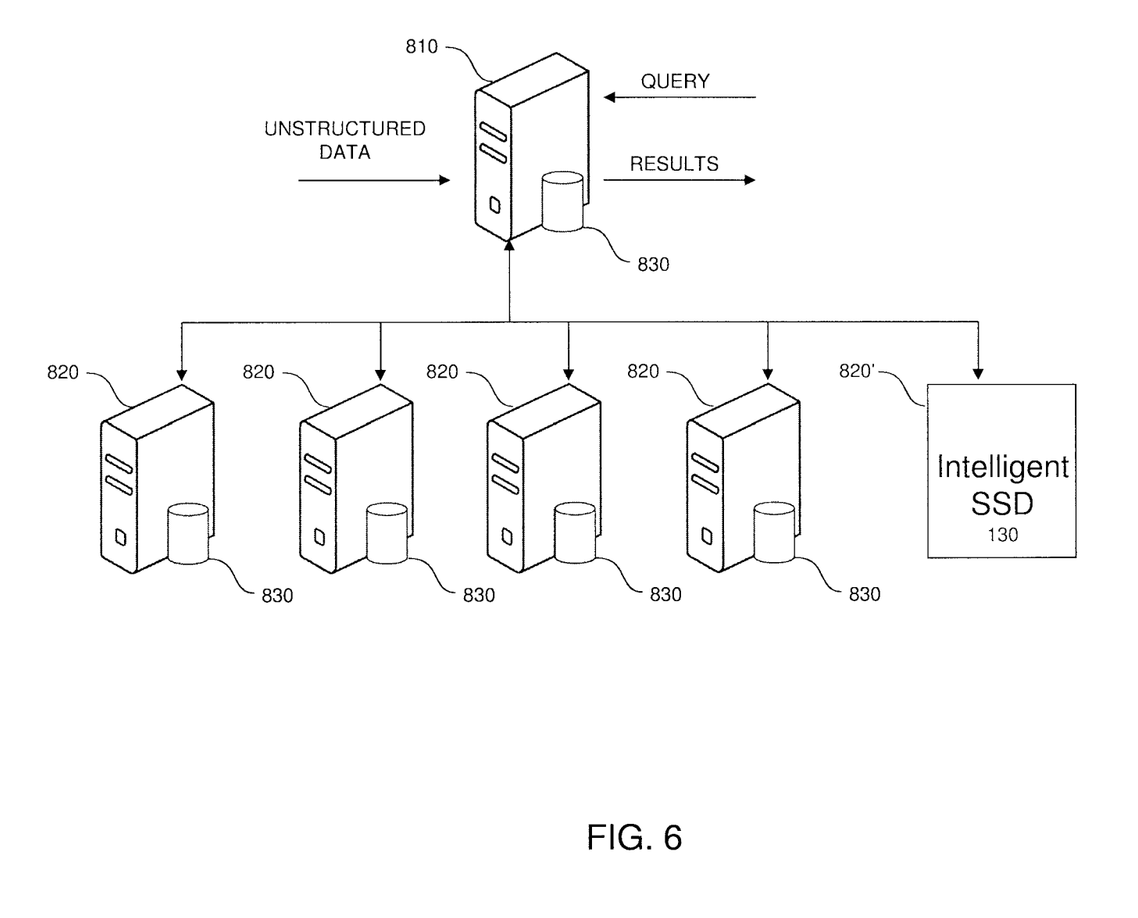
FIG. 6 shows a cluster of nodes in a distributed computing system according to an embodiment of the present invention.

Referring to FIG. 6, in one embodiment, an intelligent SSD 130 containing one or more CPUs is capable of running an operating system on one or more of its CPUs and also of running programs written in high-level languages, e.g., object-oriented languages such as Java™, Python™, Scala, or C++. Such programs may describe distributed data processing functions in a cluster of compute nodes. The cluster may include a driver node 810 and a number of worker nodes 820; the driver node and the worker nodes may each include or be connected to a storage node 830. Some or all of the storage nodes may be intelligent SSDs 130, and the remainder may be comparable storage nodes such as comparable SSDs or comparable HDDs. The intelligent SSDs 130 may contain hardware accelerated engines to improve the performance of some tasks, for example, search.

In one embodiment, the intelligent SSD 130 is part of a data node 820 in the same way that a comparable SSD 125 or other storage node may be part of a data node 820, but it is capable of executing tasks under Spark without transferring the data from the intelligent SSD 130 out to the main CPU. In another embodiment, a data node 820' is an intelligent SSD 130 itself, e.g., the data node 820' consists only of an intelligent storage node 830 (which may be an intelligent SSD 130), as illustrated by the data node 820' of FIG. 6. Each data node 820, 820' may operate as a worker node.

Figure 7:
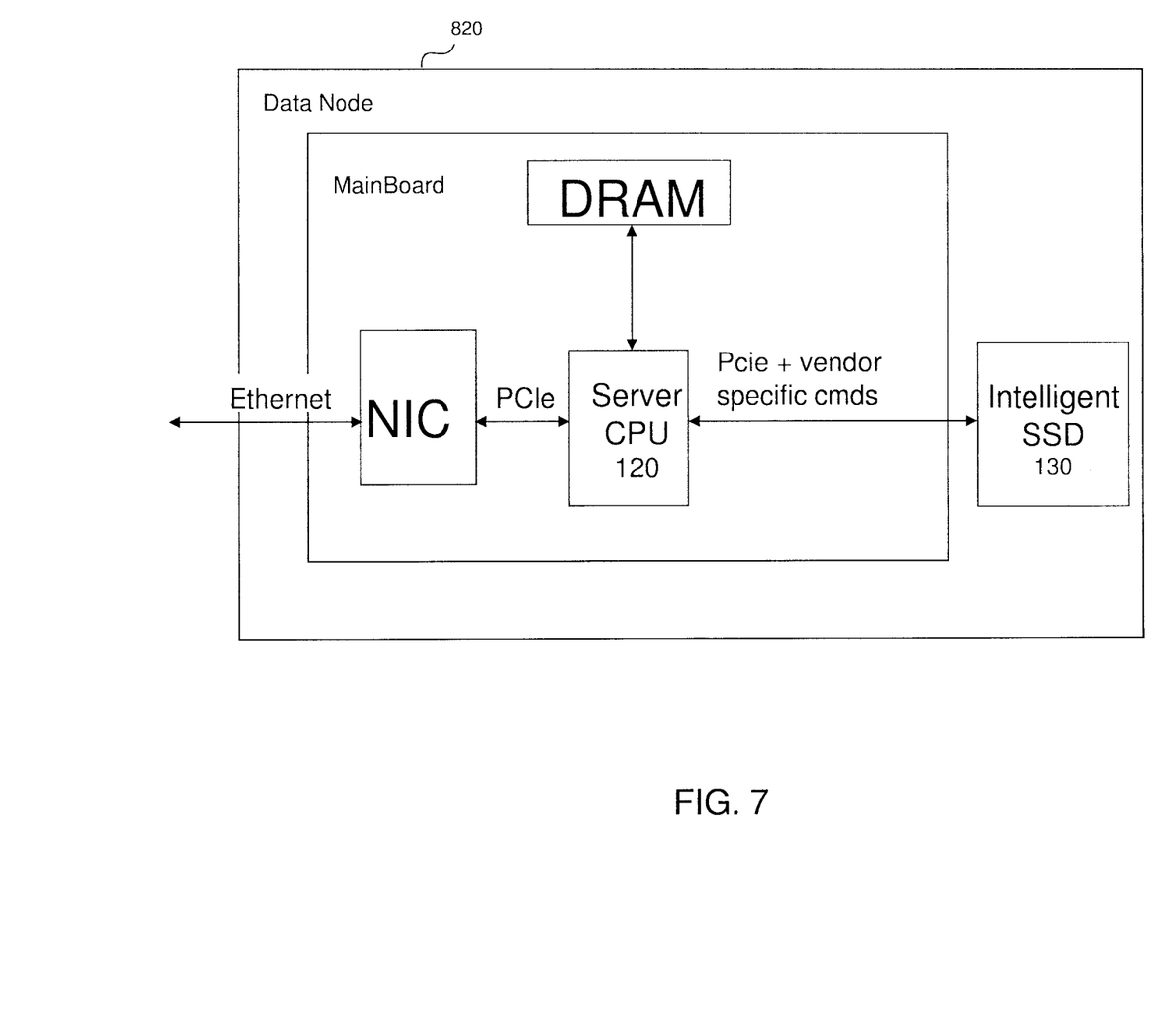
FIG. 7 shows a data node architecture according to an embodiment of the present invention.
Figure 8:
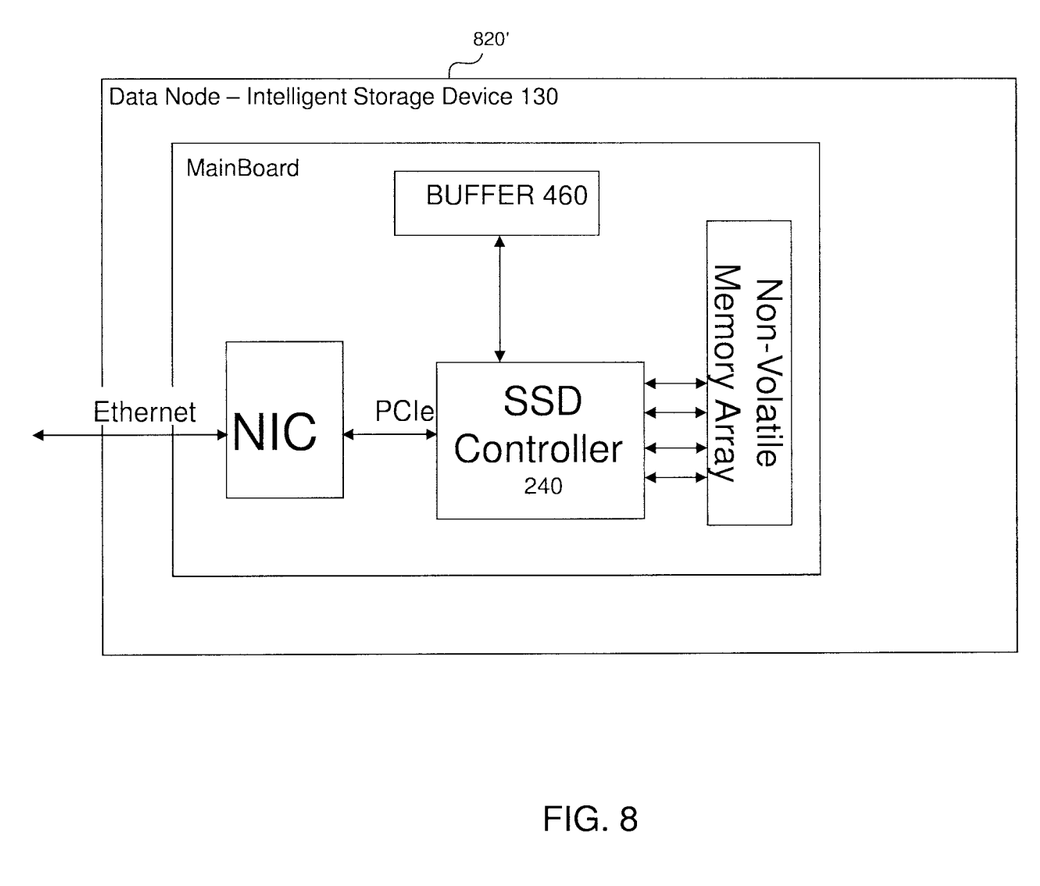
FIG. 8 shows a data node architecture according to another embodiment of the present invention.

These two possibilities are illustrated in FIGS. 7 and 8. Referring to FIG. 7, the data node 820 may have the architecture of a server, with a server CPU 120, DRAM memory, an Ethernet connection for external communications through a network interface device, e.g., a network interface card (NIC), and a storage node, which, as illustrated, may be an intelligent SSD 130. The intelligent SSD 130 may communicate with the server CPU 120 using vendor-specific commands, i.e., commands specified by the vendor of the intelligent SSD 130, which may be executed by the server CPU 120 after the installation of appropriate drivers in the data node 820. This embodiment provides value especially in legacy, i.e., existing, installations in which it may be more cost-effective to replace comparable storage nodes with intelligent SSDs 130 when the comparable storage nodes fail, or as performance improvements and power efficiency improvements are implemented.

Referring to FIG. 8, in another embodiment, the data node 820' may be the intelligent SSD 130 itself, having a NIC as a connection for external communications, a buffer unit 460, an SSD controller 240, and a flash array. The SSD controller 240 may, for example, include, as shown in FIG. 4, a CPU 410, a hardware engine 420, and a DSP 430. This embodiment may be of particular benefit in new installations, in which the use of an intelligent SSD 130 instead of a data node containing a comparable storage node may provide cost savings, in addition to improvements in performance and reductions in power consumption.

Figure 9:
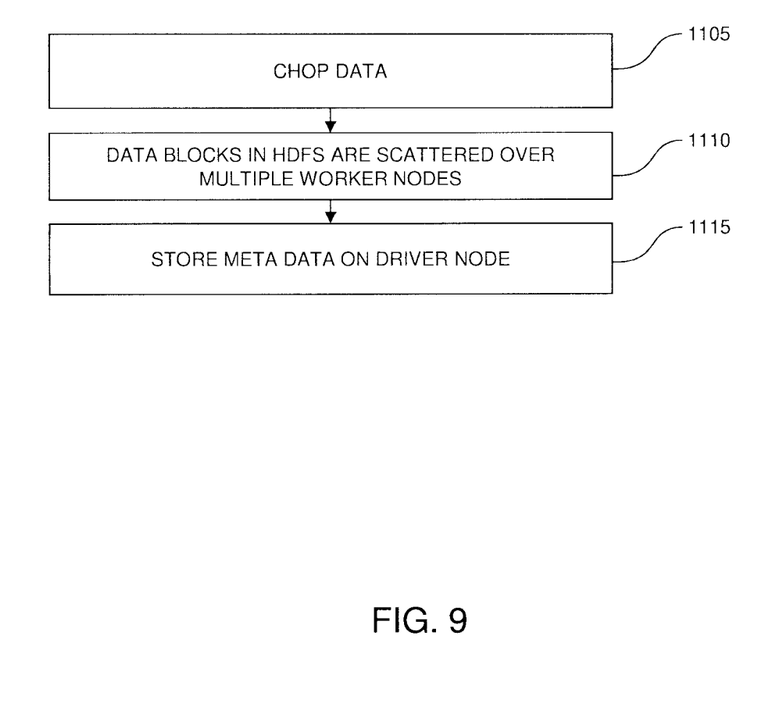
FIG. 9 is a flowchart illustrating acts involved in the storage of unstructured data in a distributed file system according to an embodiment of the present invention.
Figure 10:
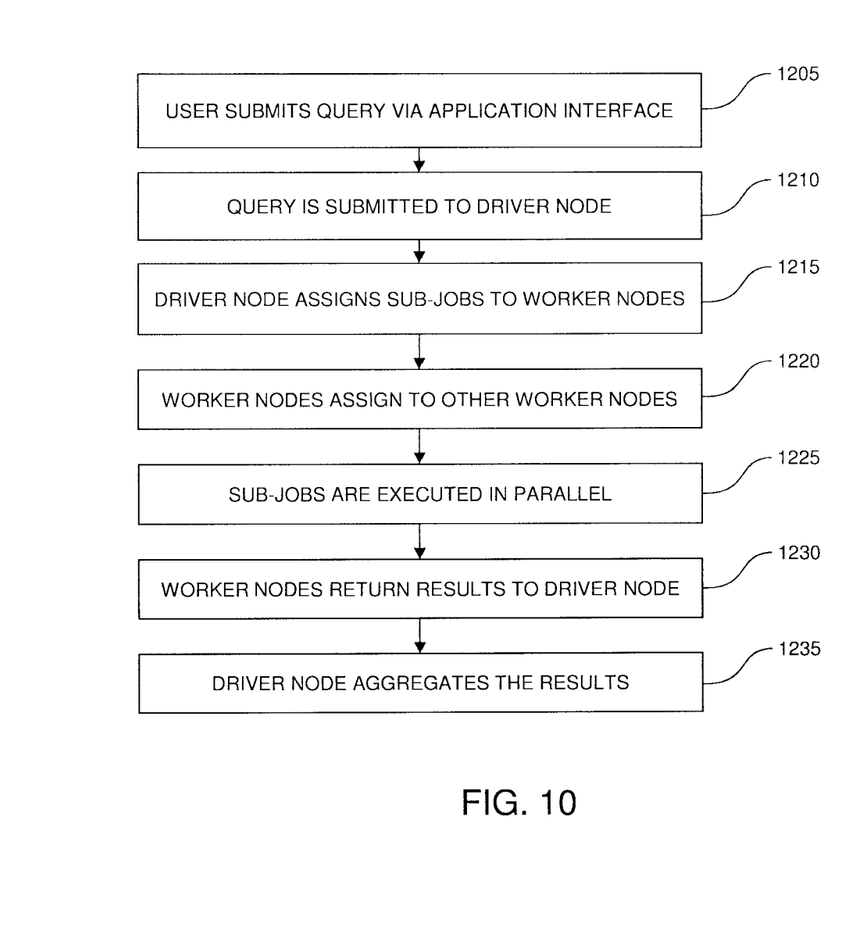
FIG. 10 is a flowchart illustrating acts involved in the execution of a query in a distributed file system according to an embodiment of the present invention.

In operation, unstructured data is placed on the data nodes (which may operate as worker nodes under Spark) via the driver node (FIG. 9), and queries are executed on the data using the Apache Spark framework (FIG. 10). Referring to FIG. 9, in one embodiment, the process of storing unstructured data on the Hadoop™ distributed file system (HDFS) includes three acts. In an act 1105, the data are chopped into multiple data blocks, which are scattered, in an act 1110, over multiple data nodes (or worker nodes) 820. Metadata for the data blocks are stored, in an act 1115, on the driver node. Unstructured data may include social feeds, geographic information systems (GIS) data, security log data, documents, extensible markup language (XML), email, web logs, images, audit logs, data from sensors in the field (e.g., weather sensors, traffic sensors, or sensors at processing facilities, such as factories, shipping facilities, or power plants), radio frequency identification (RFID) data, data about world events, data about market events, and closed-circuit television (CCTV) footage.

Referring to FIG. 10, the execution of queries involves several acts. In an act 1205, a user submits a query to the system. This may be accomplished through an application interface. In an act 1210, the query is submitted, e.g., by a client machine running the application interface, to the driver node 810, which, in an act 1215, assigns sub-jobs for executing the query to worker nodes 820. Each worker node 820 to which a sub job is assigned by the driver node 810 may optionally, in an act 1220, further assign sub-jobs to other worker nodes 820. The sub jobs are executed in parallel in an act 1225, the worker nodes 820 return the results to the driver node 810 in an act 1230, and the driver node 810, in an act 1235, aggregates the results.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein and equivalents thereof.

What is claimed is:

1. An intelligent solid state drive comprising:
a storage interface;
a processing circuit;
a data buffer; and
a flash memory;
the processing circuit configured to be in communication with the flash memory, and comprising a central processing unit;
the intelligent solid state drive having a form factor selected from the group consisting of large form factor (LFF), small form factor (SFF), full-height, full-length (FH-FL) peripheral component interconnect express (PCIe) card, and full-height, half-length (FH-HL) peripheral component interconnect express (PCIe) card;
the intelligent solid state drive being configured to:
receive, through the storage interface, a first command comprising one or more transformations, and
retrieve file data from the flash memory and perform the one or more transformations on the file data to construct a portion of a resilient distributed dataset (RDD).

2. The intelligent solid state drive of claim 1, wherein each of the one or more transformations is selected from the group consisting of map operations, filter operations, join operations, and combinations thereof.

3. The intelligent solid state drive of claim 1, wherein the intelligent solid state drive is further configured, upon receiving the first command, to construct a lineage comprising a sequence of transformations corresponding to the first command.

4. The intelligent solid state drive of claim 3, wherein the intelligent solid state drive is further configured to receive a second command requesting the elements of the portion of the RDD, and to perform the sequence of transformations of the lineage in response to receiving the second command.

5. The intelligent solid state drive of claim 4, wherein the intelligent solid state drive is further configured, when the first command includes a cache action, to store at least some of the elements of the portion of the RDD in the data buffer.

6. The intelligent solid state drive of claim 3, wherein the intelligent solid state drive is further configured, upon receipt of a second command, the second command including a collect operation, to transmit, through the storage interface, the elements of the portion of the RDD.

7. The intelligent solid state drive of claim 6, wherein the intelligent solid state drive is further configured, upon receipt of the second command:
to store at least some of the elements of the portion of the RDD in the data buffer when the first command includes a cache action, and
to discard the elements of the portion of the RDD when the first command does not include a cache action.

8. The intelligent solid state drive of claim 3, wherein the intelligent solid state drive is further configured, upon receipt of a second command, the second command including a persist action, to store at least some of the elements of the portion of the RDD in the data buffer.

9. The intelligent solid state drive of claim 1, wherein the intelligent solid state drive is further configured to receive a broadcast variable as part of a closure, and to store it until instructed to delete it.

10. The intelligent solid state drive of claim 1, wherein the intelligent solid state drive is further configured to receive an accumulator as a closure and to not perform any operations on the accumulator except to add to it.

11. The intelligent solid state drive of claim 1, wherein the intelligent solid state drive is configured to run an operating system configured to enable the intelligent solid state drive to execute a high-level object-oriented programming language.

12. A distributed computing system, comprising a cluster of nodes,
the cluster of nodes comprising:
a driver node; and
a plurality of worker nodes;
wherein a worker node of the plurality of worker nodes is an intelligent solid state drive having a form factor selected from the group consisting of large form factor (LFF), small form factor (SFF), full-height, full-length (FH-FL) peripheral component interconnect express (PCIe) card, and full-height, half-length (FH-HL) peripheral component interconnect express (PCIe) card.

13. A method of executing a data processing task in a distributed computing system comprising a driver node and a plurality of worker nodes,
a worker node of the plurality of worker nodes comprising an intelligent solid state drive,
the method comprising:
submitting the data processing task to the driver node;
assigning a plurality of tasks to the plurality of worker nodes, by the driver node, the plurality of tasks being configured to execute portions of the data processing task;
executing the plurality of tasks, by the plurality of worker nodes;
returning the results of the execution of the plurality of tasks, by the plurality of worker nodes, to the driver node; and
aggregating, by the driver node, the results of the execution of the plurality of tasks,
the intelligent solid state drive having a form factor selected from the group consisting of large form factor (LFF), small form factor (SFF), full-height, full-length (FHFL) peripheral component interconnect express (PCIe) card, and full-height, half-length (FH-HL) peripheral component interconnect express (PCIe) card.

14. The method of claim 13, comprising assigning of a task by a first worker node of the plurality of worker nodes to a second worker node of the plurality of worker nodes.

15. The method of claim 13, wherein a task of the plurality of tasks comprises an execution of a machine learning function within an Apache Spark framework.

16. The method of claim 13, wherein a task of the plurality of tasks comprises an execution of reduce and collect operations within an Apache Spark framework.

* * * * *